United States Patent
Higley et al.

(10) Patent No.: US 12,366,711 B2
(45) Date of Patent: Jul. 22, 2025

(54) SMALL FORM FACTOR FIBER OPTIC CONNECTOR DUST CAP

(71) Applicant: US Conec Ltd., Hickory, NC (US)

(72) Inventors: Jason Higley, Hickory, NC (US); Jillcha F. Wakjira, Hickory, NC (US); Shubhrangshu Sengupta, Hickory, NC (US)

(73) Assignee: US Conec Ltd., Hickory, NC (US)

(*) Notice: Subject to any disclaimer, the term of this patent is extended or adjusted under 35 U.S.C. 154(b) by 177 days.

(21) Appl. No.: 18/063,050

(22) Filed: Dec. 7, 2022

(65) Prior Publication Data
US 2023/0176294 A1 Jun. 8, 2023

Related U.S. Application Data

(60) Provisional application No. 63/287,296, filed on Dec. 8, 2021.

(51) Int. Cl.
*G02B 6/38* (2006.01)
(52) U.S. Cl.
CPC ............ *G02B 6/3849* (2013.01); *G02B 6/387* (2013.01); *G02B 6/3897* (2013.01)
(58) Field of Classification Search
CPC .... G02B 6/3849; G02B 6/387; G02B 6/3897; G02B 6/3885
See application file for complete search history.

(56) References Cited

U.S. PATENT DOCUMENTS

| 8,262,294 B2 | 9/2012 | Marcouiller et al. |
| 2011/0058775 A1* | 3/2011 | Chen ............... G02B 6/3849 385/139 |
| 2023/0305238 A1* | 9/2023 | Petersen .......... G02B 6/3831 |

FOREIGN PATENT DOCUMENTS

WO 2021217050 A1 10/2021

* cited by examiner

*Primary Examiner* — John Bedtelyon
(74) *Attorney, Agent, or Firm* — Michael L Leetzow PLLC; Shubhrangshu Sengupta

(57) ABSTRACT

A small form factor dust cap for a fiber-optic connector includes a main body having a front portion, a middle portion, a rear portion, and an internal opening extending within the main body from the rear portion toward the front portion, the main body formed by two long side walls joined by a short top wall and an oppositely placed short bottom wall, a pair of cutouts in each of the respective two long side walls and located nearer to one of the short top wall and the short bottom wall, an extension extending rearwardly from the middle portion and having a free end, and an engagement mechanism at the free end of the extension to engage a housing of the fiber optic connector. The dust cap is also combined with a small form factor fiber optic connector.

20 Claims, 16 Drawing Sheets

SMALL FORM FACTOR FIBER OPTIC CONNECTOR DUST CAP

BACKGROUND OF THE INVENTION

This application claims priority to U.S. Provisional Patent Application Ser. No. 63/287,296, filed on Dec. 8, 2021, the contents of all of which are incorporated by reference.

FIELD OF THE INVENTION

Fiber-optic connectors have one or more ferrules that support optical fibers. Such ferrules have end faces where optical fibers are terminated. Exposed ends of the optical fibers supported by the ferrule are exposed to the environment when the fiber-optic connector is in use. When not in use, it is conventional to have the end faces of the optical fibers and the ferrules covered. To achieve this goal, several types of dust caps are available for various respective fiber-optic connectors. These dust caps are installed onto the fiber-optic connectors at the exposed ends and prevent dust and debris from deposition on the exposed end faces of the optical fibers. If unchecked, such dust and debris may disrupt optical communications, although cleaning tools help in this regard.

In recent years, very small form factor (VSFF) fiber-optic connectors have been gaining popularity for high density connector environments (e.g., in a datacenter) for high speed optical communications. One example of such small form factor connector is the MMC connector provided by the Applicant. Such small connectors meet the industry-adopted QSFP-DD format, for example. A smaller form factor corresponds to a smaller front profile and footprint of the fiber optic connector. Hence, smaller dust caps are needed that can stay secured to such small optical connectors and are still easy to remove for the end user when needed.

Applicants have identified that one challenge in keeping the dust cap attached to the fiber-optic connector is that due to the very small dimensions and size of the fiber-optic connector, there is not enough space to add extra physical structures to a body of the fiber-optic connector (or, housing) to securely hold the dust cap. At the same time, if the attachment to the fiber-optic connector is too tight, the dust cap may become too unwieldy and hard to remove by an end user without any extra tools or devices.

SUMMARY OF THE INVENTION

The present invention is directed to a small form factor dust cap for a fiber-optic connector that includes a main body having a front portion, a middle portion, a rear portion, and an internal opening extending within the main body from the rear portion toward the front portion, the main body formed by two long side walls joined by a short top wall and an oppositely placed short bottom wall, a pair of cutouts in each of the respective two long side walls and located nearer to one of the short top wall and the short bottom wall, an extension extending rearwardly from the middle portion and having a free end, and an engagement mechanism at the free end of the extension to engage a housing of the fiber optic connector.

In some embodiments, the cutouts in the two long side walls at least partially form the extension extending rearwardly from the middle portion.

In some embodiments, the extension is formed at least in part by the short bottom wall.

In some embodiments, the extension extends farther rearward than a rear end of the short top wall.

In other embodiments, there is also a receptacle in the short top wall to receive a portion of the fiber optic connector.

In some embodiments, the engagement mechanism includes a projection from the extension and a groove disposed between the projection and the middle portion.

In other embodiments, the short top wall extends rearwardly beyond the extension.

In one embodiment, the engagement mechanism includes a bridge portion extending from one long side wall to the other long side wall.

In another aspect, the invention is directed to a combination of a dust cap and a small form factor fiber-optic connector, the combination includes a dust cap having an internal opening to receive the small form factor fiber-optic connector, the dust cap further includes a main body having a front portion, a middle portion, a rear portion, and being formed by two long side walls joined by a short top wall and an oppositely placed short bottom wall, a guide mechanism extending from the rear portion toward the front portion of the main body to guide the small form factor fiber-optic connector within the internal opening, an engagement mechanism at the rear portion to engage with the fiber-optic connector, and a cutout in each of the long side walls of the dust cap, wherein the cutout is provided asymmetrically relative to the short top wall and the short bottom wall, and then the small form-factor fiber optic connector includes a push-pull boot having a latch mechanism extending forwardly and received at least partially within the internal opening of the dust cap, the push-pull boot supporting at least two optical fibers, a housing having a housing notch or a groove to receive the engagement mechanism of the dust cap, a ferrule cap engaged to the housing and located forward of the housing, the ferrule cap received at least partially within the internal opening of the dust cap, and a multi-fiber ferrule provided at least partially within the ferrule cap and having an end face fully enclosed by the dust cap when the dust cap is engaged with the small form factor fiber-optic connector to prevent dust and debris from being able to reach the end face.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
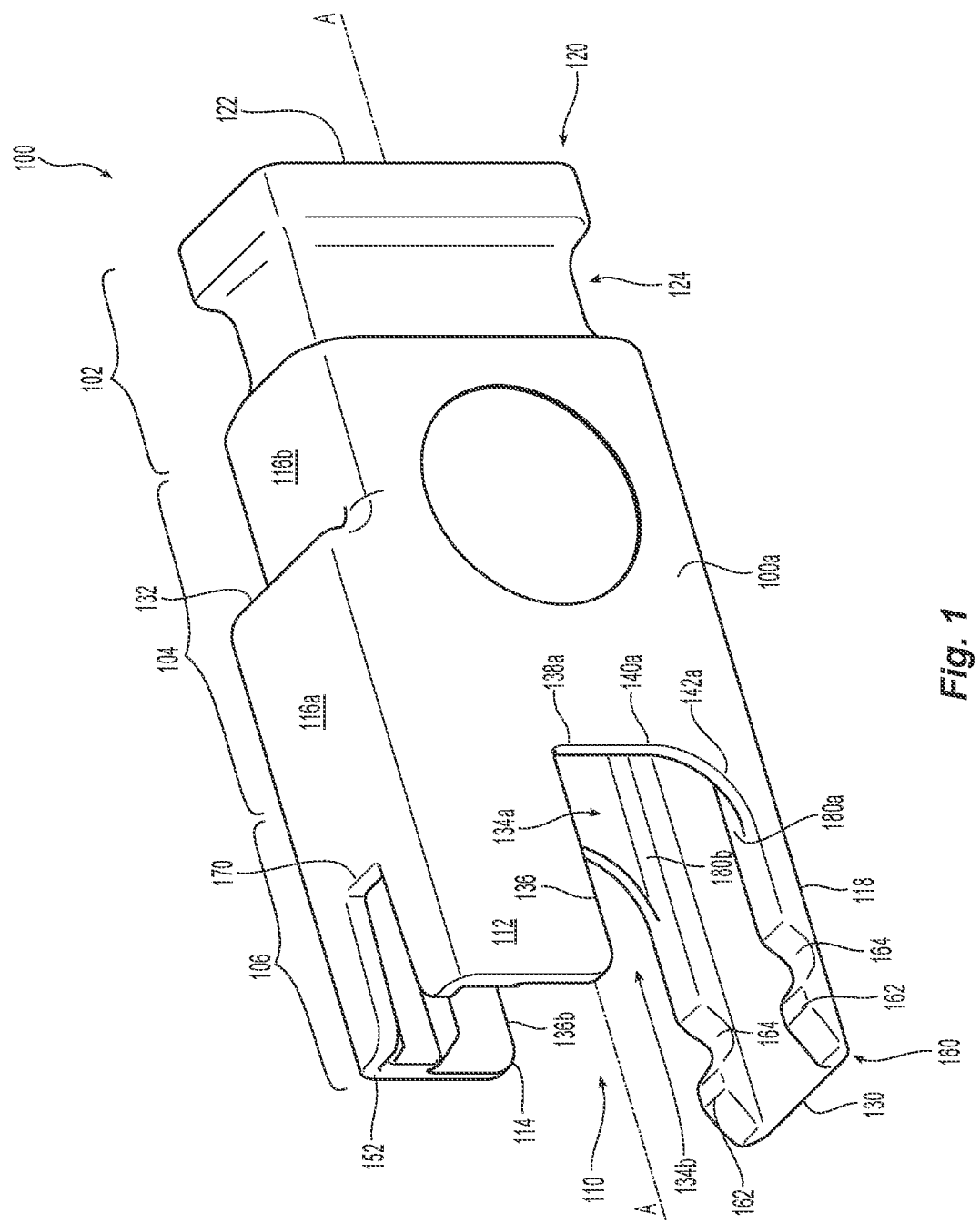
FIG. 1 is a top right perspective view of one embodiment of a dust cap for use with a small form factor fiber-optic connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
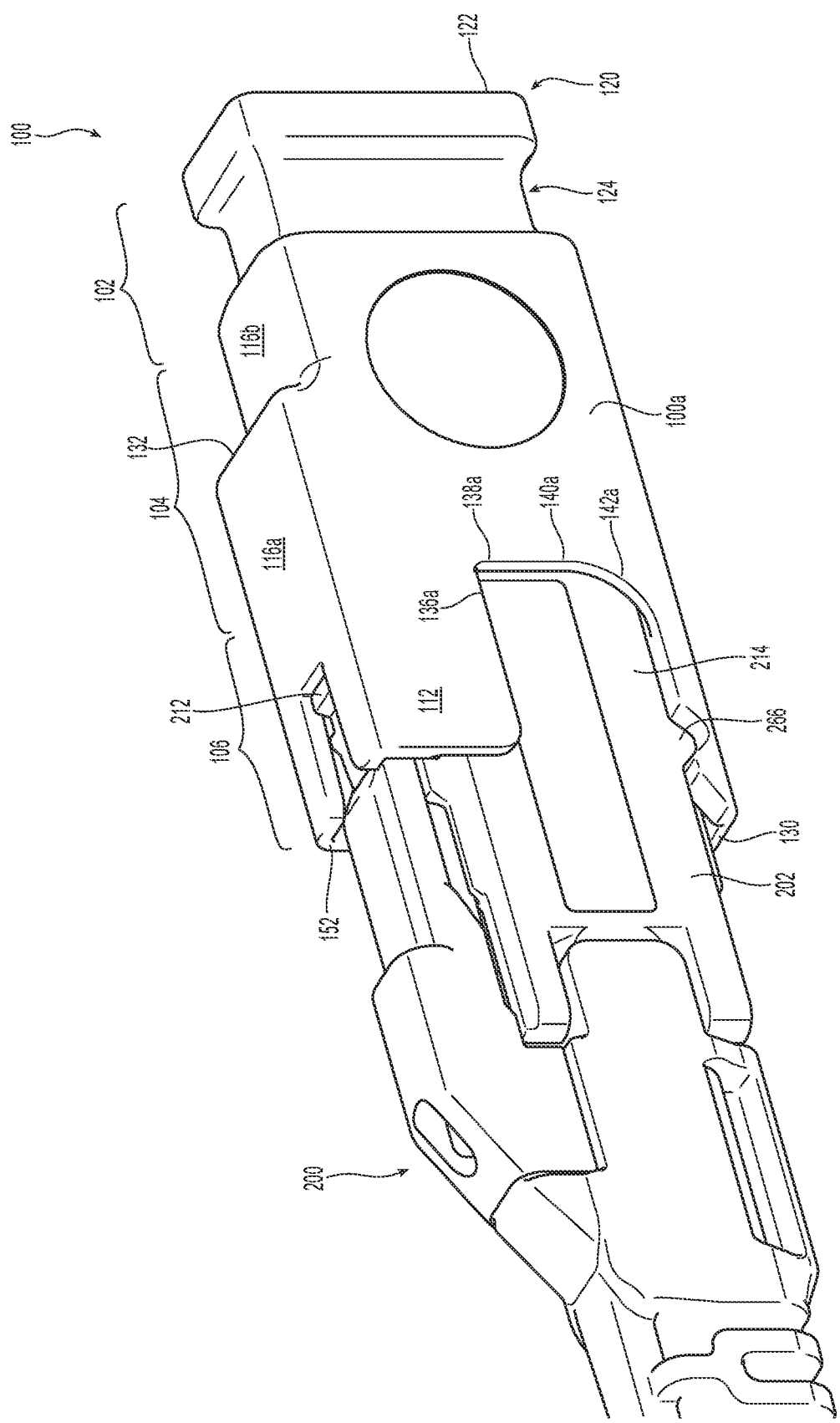
FIG. 2 is top right perspective view of the dust cap in FIG. 1 installed on one embodiment of a small form factor fiber-optic connector.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Each of the components will therefore have a front and rear, and the two respective fronts or forward portions of opposing ferrules would engage one another. Thus, in FIG. 2, the "front" of the fiber optic connector and the dust cap is on the right side and "forward" is to the right and into the page. "Rearward" or "rear" is that part of the fiber optic connector that is on the left side of the page and "rearward" and "backward" is toward the left and out of the page.

One embodiment of a small form factor dust cap 100 ("dust cap") for a very small form factor fiber-optic connector 200 (fiber optic connector) is illustrated in FIGS. 1-7. The dust cap 100 has a main body 100a having a front portion 102, a middle portion 104, a rear portion 106, and an internal opening 110 extending within the main body 100a from the rear portion 106 toward the front portion 102. See also FIGS. 3, 5C, and 7. The main body 100a is formed by two long side walls 112, 114 joined by a short top wall 116 and an oppositely placed short bottom wall 118. The terms "short" and "long" generally refer to the width of the walls and not the length along the longitudinal axis A (i.e. from the front portion 104 to the rear portion 108). See, e.g., FIG. 1. Thus, as illustrated in FIGS. 5B and 5C, the short walls 116, 118 are on the top and bottom and separated from each other by the long walls 112, 114. Thus, the long walls 112, 114 are closer to one another as they are separated by the short walls 116, 118.

Figure 13:
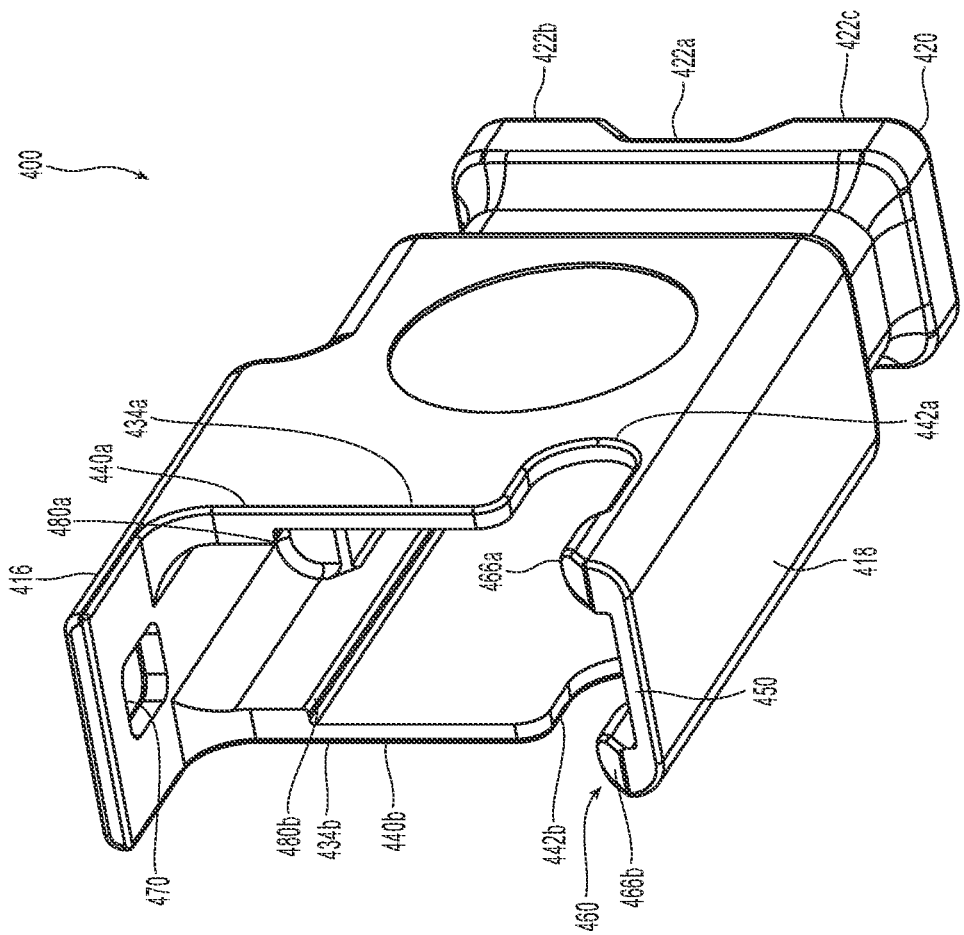
FIG. 13 is a bottom right perspective view of a third embodiment of a dust cap for use with the fiber-optic connector according to the present invention.
Figure 14:
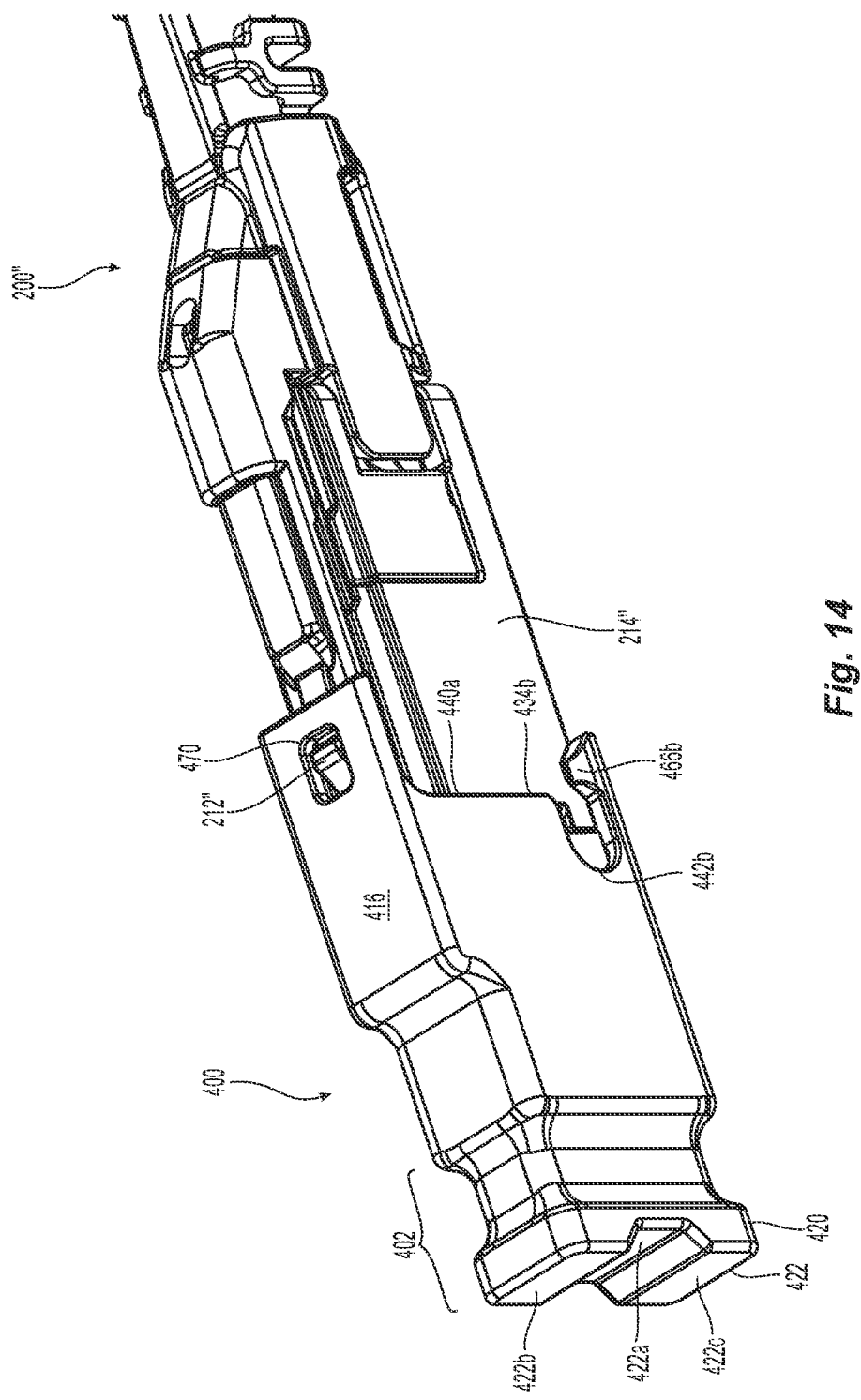
FIG. 14 is a bottom right perspective view of the dust cap in FIG. 13 with the fiber-optic connector.

The front portion 104 has a front end 120 that extends rearwardly from a flat face 122 to a recessed portion 124. The front end 120 creates a place for the user to grab hold of the dust cap 100 for easy manipulation—removing or installing. While the front end 120 has a flat face 122, there may other configurations or other features that are incorporated into the front end 120, for example, a recess 422a in the front end or around the circumference of the front end 120. See FIGS. 13-15.

Turning to the walls, the short bottom wall 118 is flat from the recessed portion 124 to a rear end 130 of the short bottom wall 118. See FIGS. 3-5C and 7. The short top wall 116 has two sections 116a and 116b that are flat, but there is a step 132 between them. This configuration (and the resulting opening 110) matches the configuration of the fiber-optic connector 200, thereby minimizing the space between the insides surfaces of the walls (112, 114, 116, and 118), resulting in less dirt and other deposits on the end faces of the fiber-optic connector 200. There may be other configurations of the short walls 116, 118 and the long walls 112, 114. It should be noted that the front portion 104, the middle portion 106, the rear portion 108 are merely relative terms to aid in the description and that certain parts may overlap into two different portions.

Figure 8:
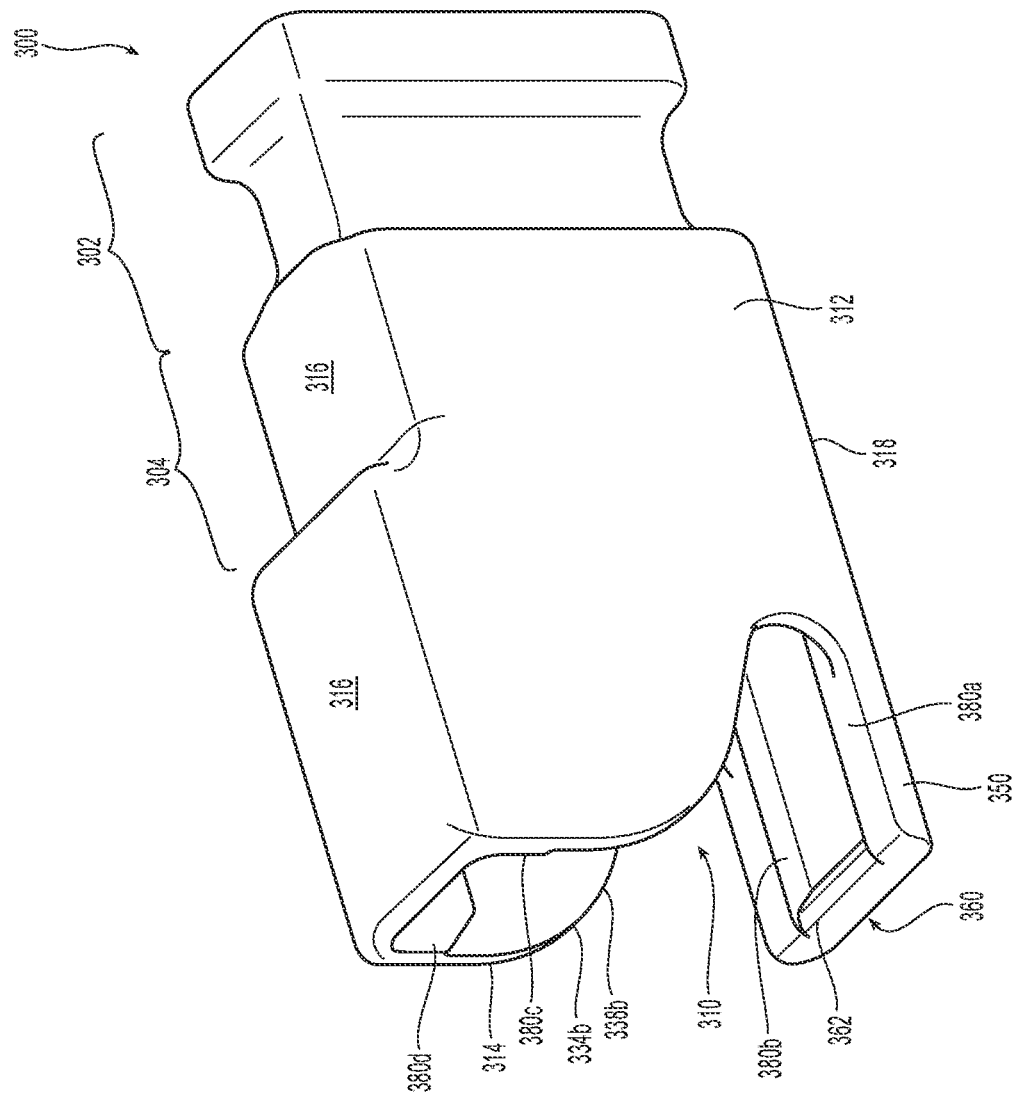
FIG. 8 is a top right perspective view of a second embodiment of a dust cap for use with the fiber-optic connector according to the present invention.
Figure 9:
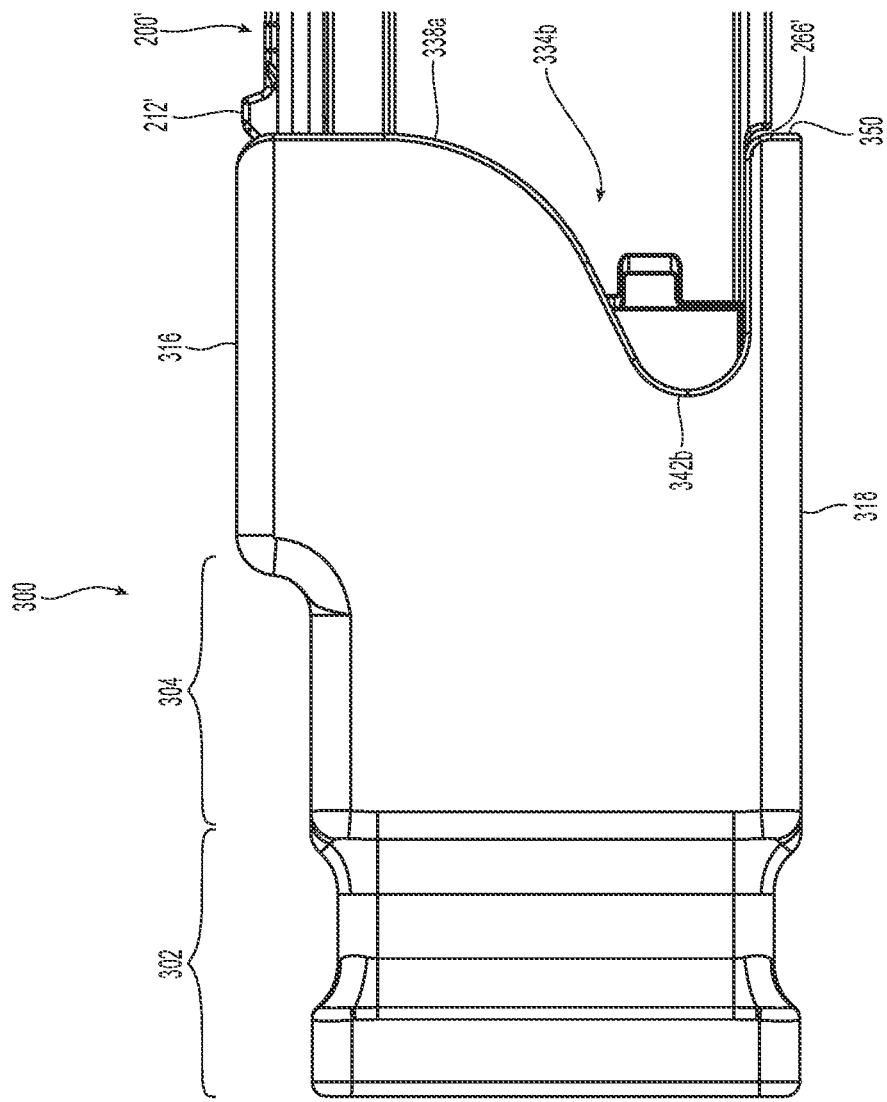
FIG. 9 is side elevational view of the dust cap in FIG. 8 with the fiber-optic connector in FIG. 2.
Figure 10:
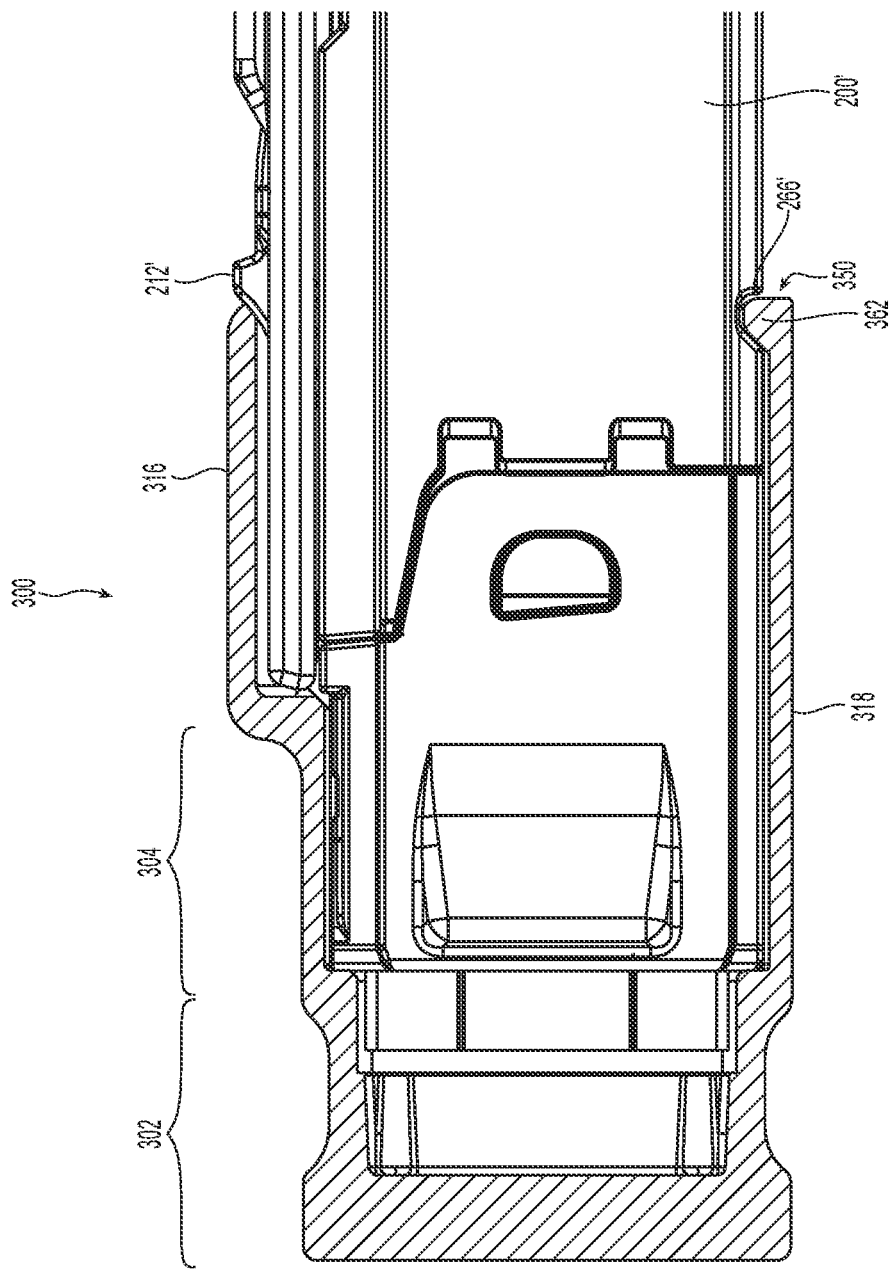
FIG. 10 is an elevational view of a cross section of the dust cap and the small form factor fiber-optic connector of FIG. 9.
Figure 11:
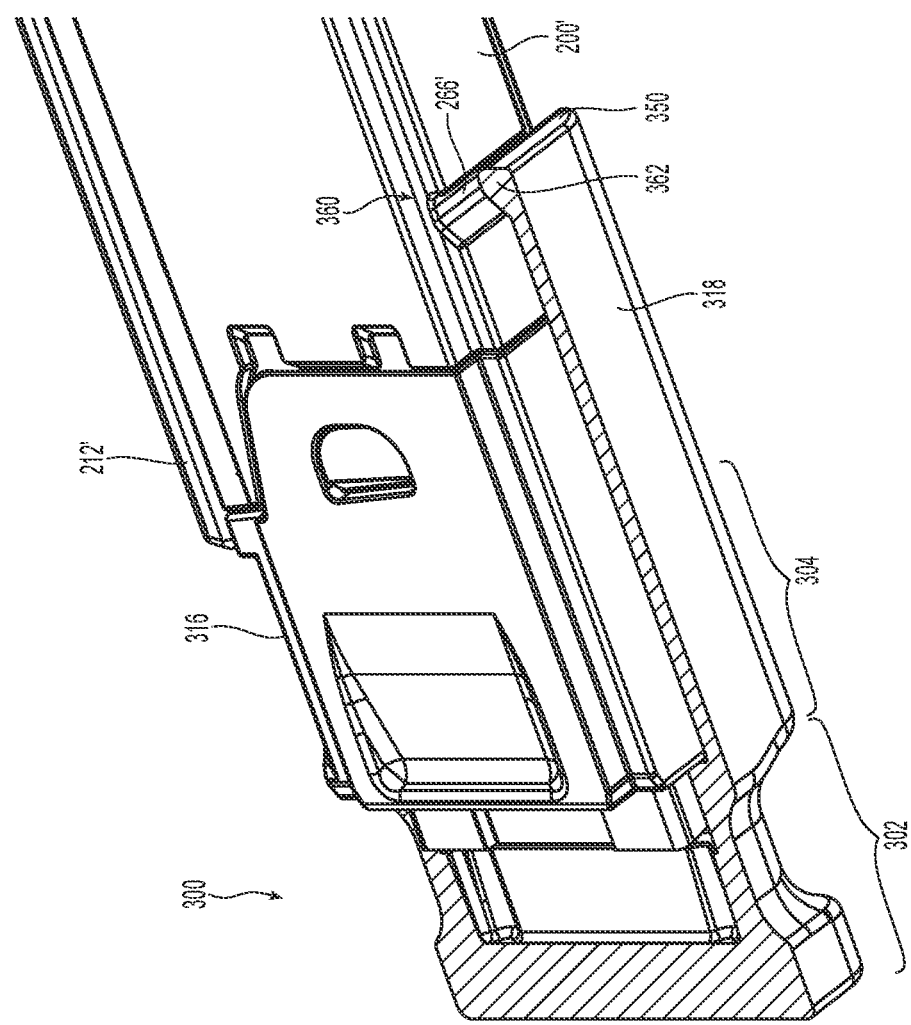
FIG. 11 is a cross section view of the dust cap of FIG. 8 showing the bottom of the fiber-optic connector in the dust cap.
Figure 12:
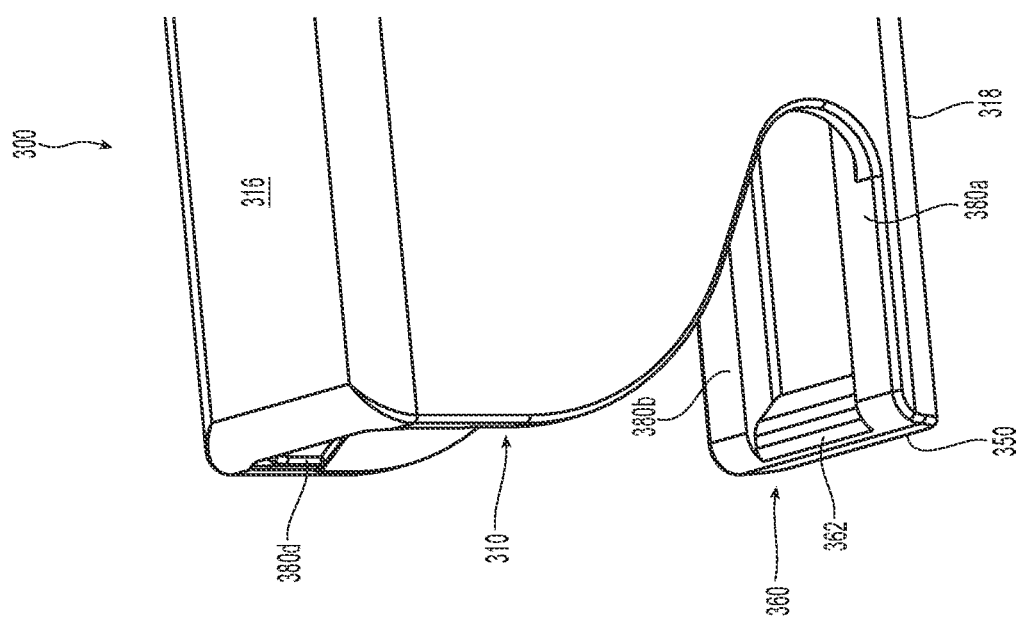
FIG. 12 is an enlarged view of the bottom of the dust cap of FIG. 8 showing the bridge that engages the fiber-optic connector.

Each of the long walls 112, 114 have a cutout 134a, 134b. The cutouts 134a, 134b are illustrated as having a top edge 136a, 136b that is generally parallel to the short top wall 116 and an edge 138a, 138b with a straight portion 140a, 140b and a curved portion 142a, 142b that then transitions to the short bottom wall 118. The configuration of the cutouts 134a, 134b could have different sizes, shapes, locations, etc. See FIGS. 8, 13, and 16. However, the cutouts 134a, 134b are preferably disposed within the long walls 112, 114 in an asymmetric manner between the short top wall 116 and the short bottom wall 118 helps with flexibility of the rear portion 106 of the dust cap 100, thereby making installation or removal thereof fairly ergonomically for the user without compromising on the secure attachment. From the middle portion 104, there is an extension 150 that extends to the rear end 130, which is also a free end. In this embodiment, the extension 150 is also a part of the short bottom wall 118. The extension 150 preferably extends rearwardly of a rear end 152 of the short top wall 116 (wall 116a). However, the two rear ends 130 and 152 may be aligned or the rear end 152 of the short top wall 116 may extend rearwardly of the rear end 130. See also FIG. 13.

At the free end (rear end) 130 is an engagement mechanism 160, on each side of the extension 150 that engages the fiber optic connector 200, and preferably a housing 214 thereof. In this embodiment of the engagement mechanism 160, there are two projections 162 on each side that extend from the extension 150 upward toward the top short wall 116. Behind each of the two projections 162 are two grooves or notches 164 that receive a housing projection or wedge 266 to assist in anchoring the dust cap 100 to the fiber optic connector 200. Each of the projections 162 have a rear facing surface 168 that is at an angle to the longitudinal axis A to act as a ramp or chamfered surface to assist in guiding the fiber optic connector 200 into the dust cap 100. The engagement mechanism 160 may also have the two grooves or notches 164 on the fiber optic connector 200 to engage the projection or wedge on the dust cap 100.

There may also be a receptacle 170 in the short top wall 116 to receive a portion of the fiber optic connector 200. In most cases, the receptacle 170 would be receiving a latch mechanism 212 on the fiber optic connector 200. In the illustrated fiber optic connector 200, the latch mechanism 212 is push-pull boot, but there may be other latches that are not a part of a (push-pull) boot. As illustrated, the receptacle 170 extends completely through the short top wall 116. However, it is possible that the receptacle can take other shapes or forms. For example, the receptacle 170 may only be an indentation or recessed portion that is in communication with the internal opening 110 and does not penetrate through the short top wall 116. The shape, illustrated as generally rectangular, may also take other shapes, e.g., square or oval and the short walls may be rounded.

Moving to the internal features of the dust cap 100, these are best illustrated in FIGS. 1, 3, 5A, and 7. Within the internal opening 110 are fiber optic connector guides 180*a*, 180*b*, 180*c*, and 180*d*, which assist in aligning the fiber optic connector 200 within the dust cap 100. They also limit the transverse and/or horizontal movement of the fiber optic connector 200 within the dust cap 100, thereby protecting the fiber optic connector 200. The fiber optic connector guides 180*a*, 180*b*, 180*c*, and 180*d*, are essentially rails that are in each of the corners of the dust cap 100 and project into the internal opening 110. They preferably extend from the rear end or free end 130 of the short bottom wall 118 and the rear end 152 of the short top wall 116 in a forward direction to the second portion 104. The fiber optic connector guides 180*a*, 180*b*, 180*c*, and 180*d* match with corresponding structures 282*a*, 282*b*, 282*c*, and 282*d* on the fiber optic connector 200. It is clear in FIGS. 1 and 7 that the engagement mechanism 160 is integral with at least a portion of the fiber optic connector guides 180*a* and 180*b*.

The fiber optic connector 200 is generally known in the art and includes a push-pull boot 210 having a latch mechanism 212 extending forwardly and received at least partially within the internal opening 110 of the dust cap 100. The push-pull boot 210 supports at least two optical fibers (not shown) that are inserted from the rear of the fiber optic connector 200. The fiber optic connector 200 also includes a housing 214 having a housing projection or wedge 266 on each side to be inserted into the grooves or notches 164 of the dust cap 100. As noted above, these features may be reversed on the dust cap 100 and the fiber optic connector 200.

Figure 3:
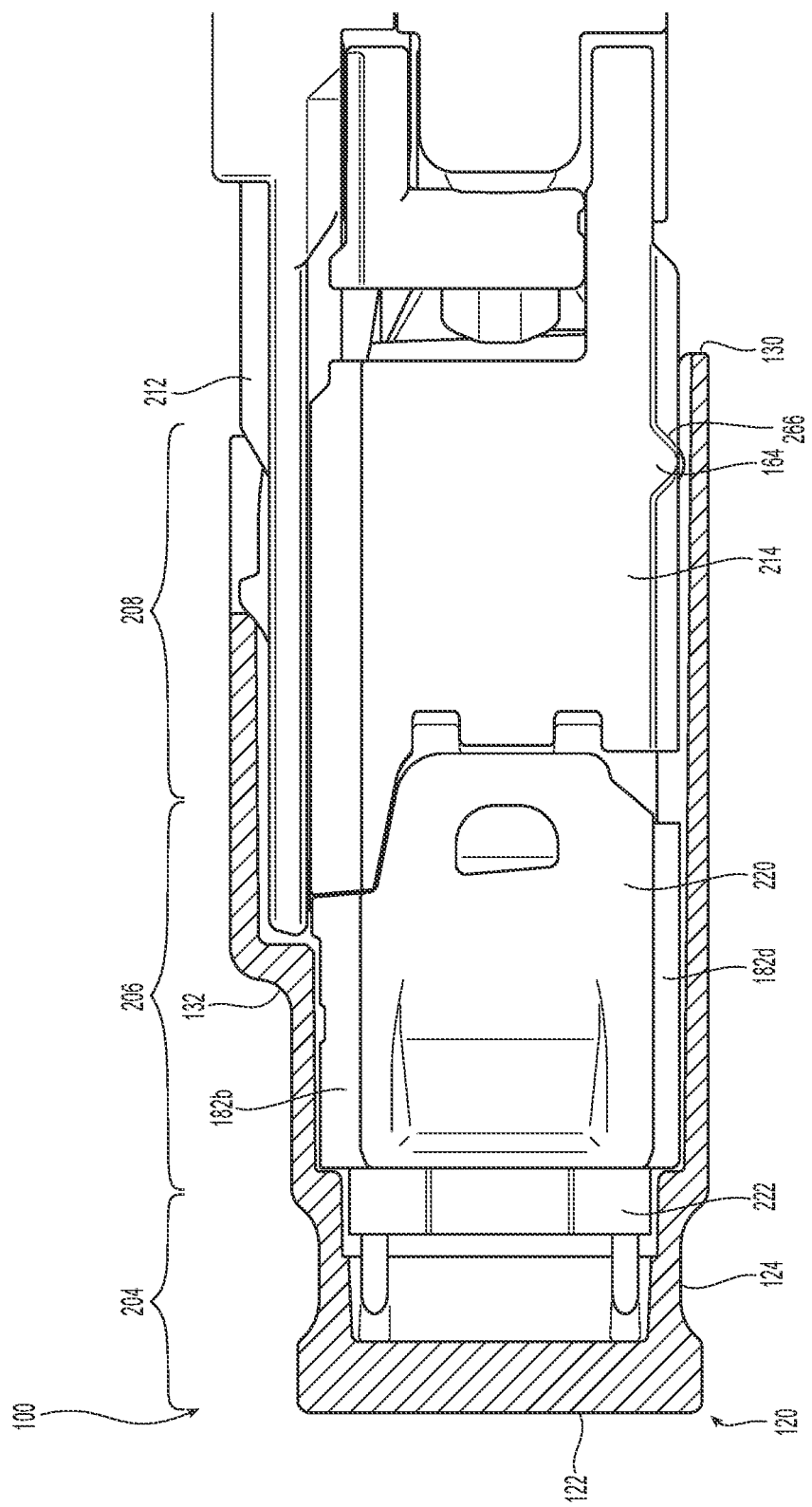
FIG. 3 is an elevational view of a cross section of the dust cap and the small form factor fiber-optic connector in FIG. 2.
Figure 4:
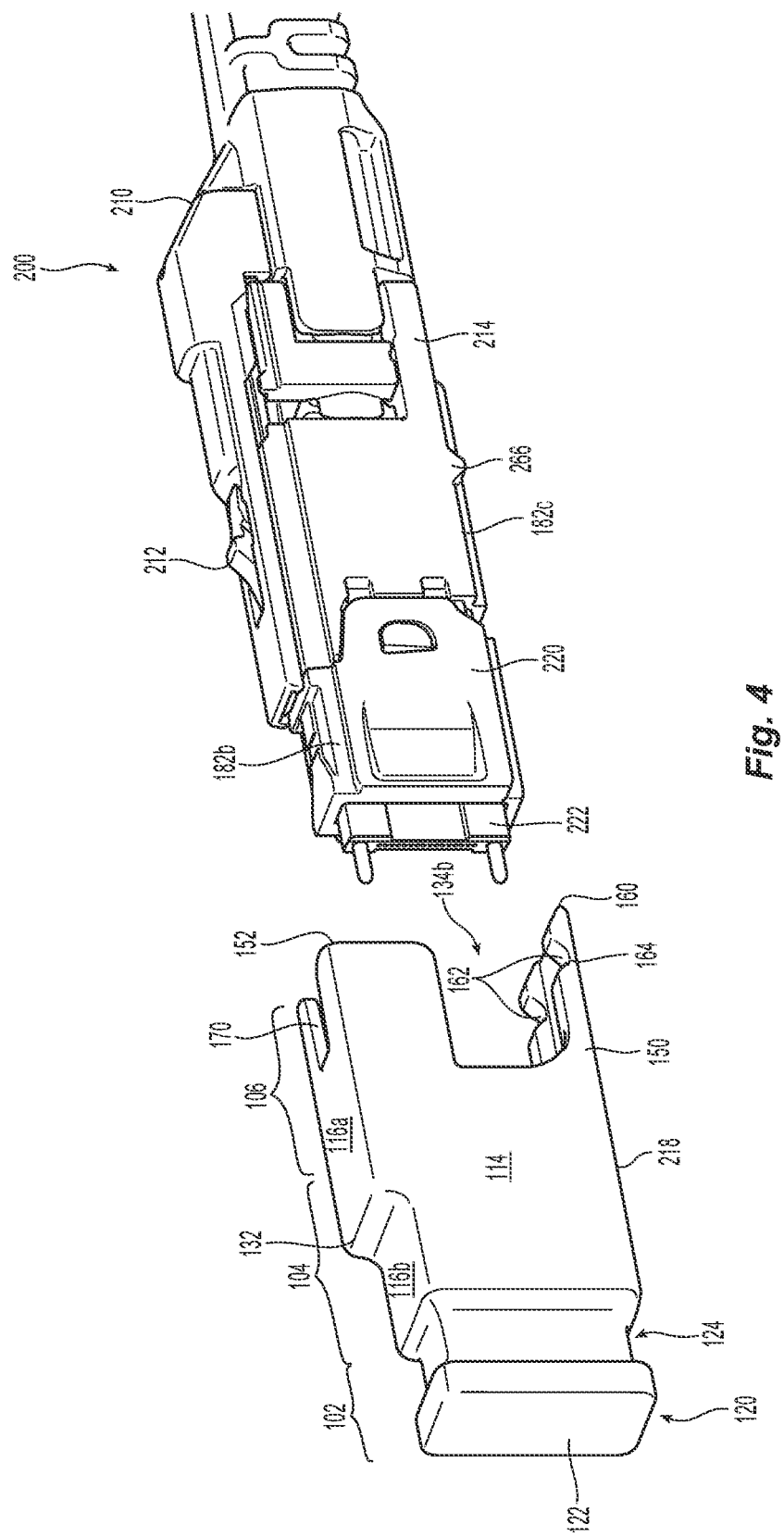
FIG. 4 is a perspective view of the dust cap and small form factor fiber-optic connector of FIG. 2 separated from one another.
Figure 5:
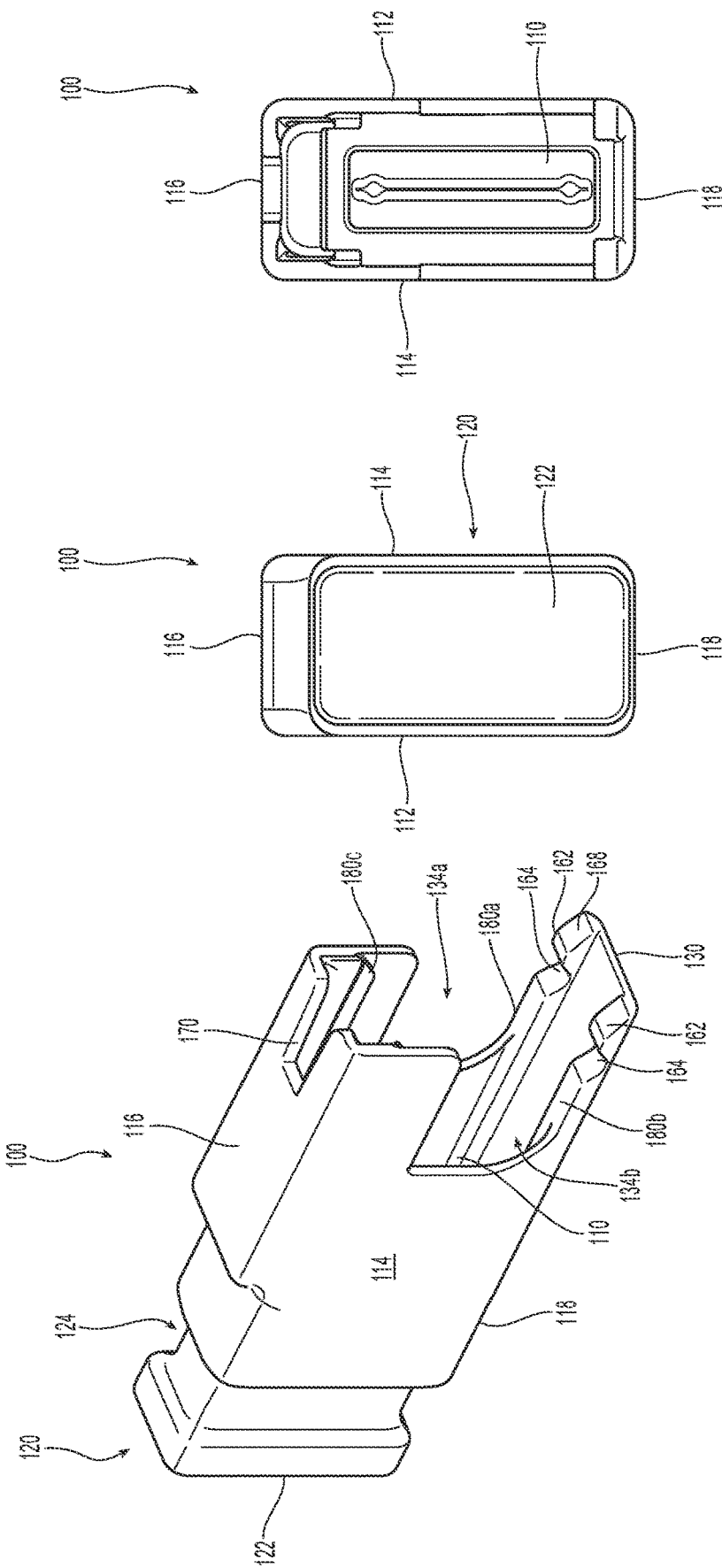
FIG. 5A is a perspective view of the dust cap of FIG. 1 from the left rear.
FIG. 5B is an elevational view from the front end of the dust cap of FIG. 1.
FIG. 5C is an elevational view from the rear end of the dust cap of FIG. 1.
Figure 6:
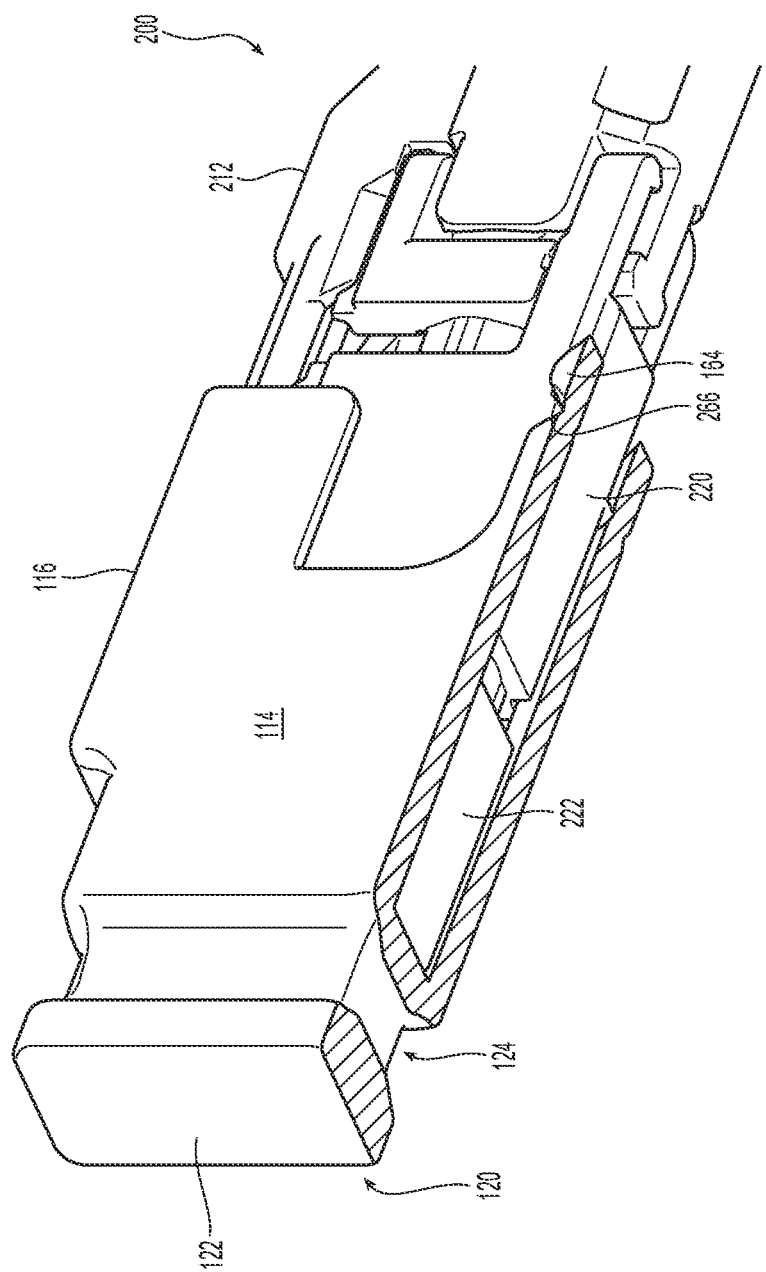
FIG. 6 is a bottom left perspective view of dust cap of FIG. 1 showing a cross section of the bottom of the dust cap.
Figure 7:
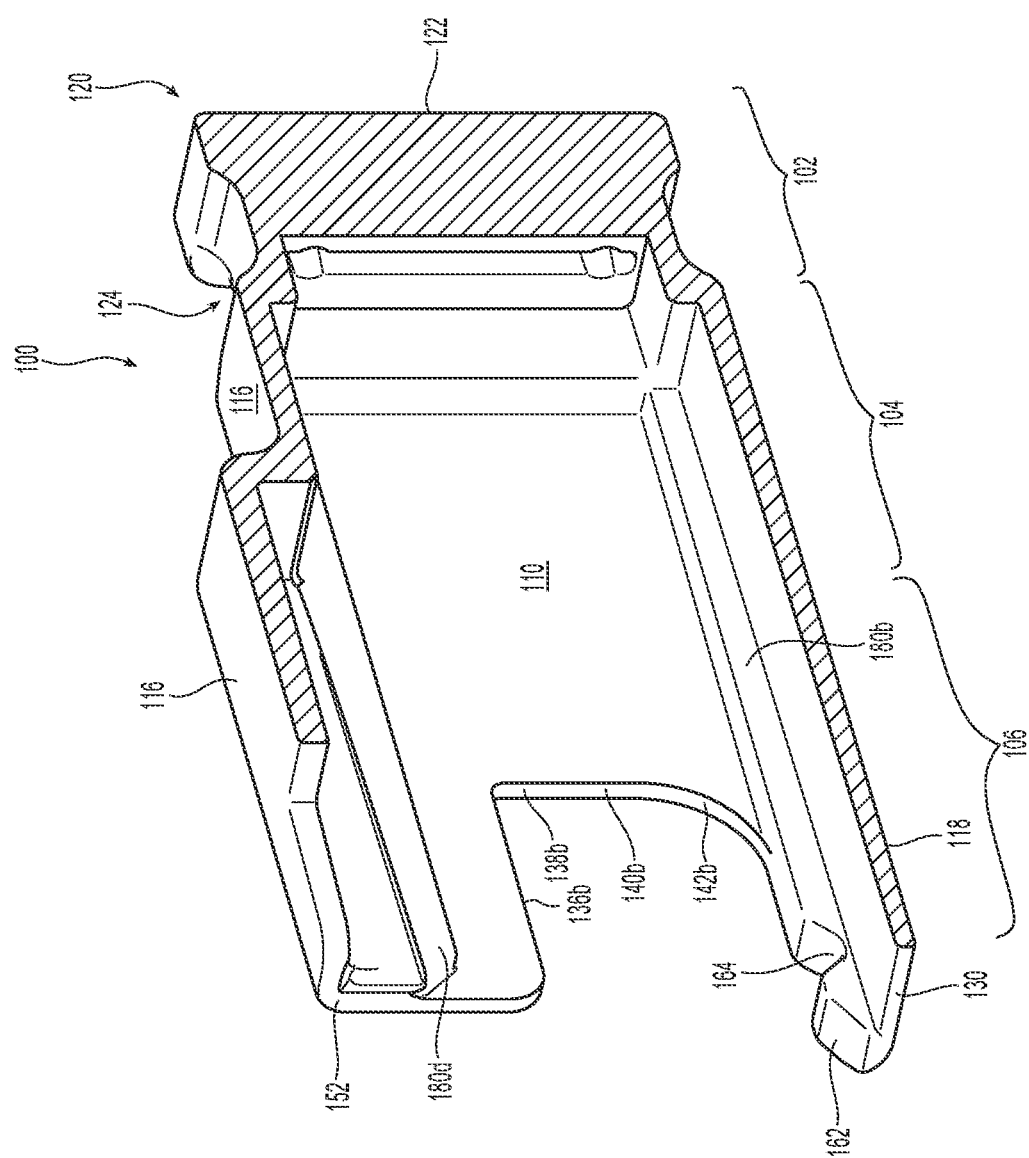
FIG. 7 is a cross section view from one side of the dust cap of FIG. 1.

The fiber optic connector 200 may also have a ferrule cap 220 engaged to the housing 214 and located forward of the housing 214. As illustrated in FIGS. 3, 4, and 6, the ferrule cap (or receiver) 220 is received at least partially within the internal opening 110 of the dust cap 100. Finally, there is a multi-fiber ferrule 222 provided at least partially within the ferrule cap 220 and having an end face 224 fully enclosed by the dust cap 100 when the dust cap 100 is engaged with the small form factor fiber-optic connector 200. The multi-fiber ferrule 222 has a front profile with the typical dimensions of 1.25 mm height between the long sides 112, 114 of the dust cap 100, 4 mm length between the front portion 102 and the middle portion 104 of the dust cap 100, and a width of 6.4 mm between two short sides 116, 118 of the dust cap 100 within the internal opening 110. See also WIPO Pub. No. WO 2021/217050 by the Applicant.

A second embodiment of a dust cap 300 is illustrated in FIGS. 8-12. The dust cap 300 has the same configuration for the front portion 302 and the middle portion 304 as the prior embodiment of dust cap 100. The interior opening 310 also has the same configuration in the front and middle portions 304, 306 as the prior embodiment. There are three main differences in this embodiment: the cutouts 334*a*, 334*b*; the engagement mechanism 360; and the lack of a receptacle in the short top wall 316.

The cutouts 334*a*, 334*b* are disposed within the long side walls 312, 314 and are asymmetric. They each have an edge 338*a*, 338*b* with a curved portion 342*a*, 342*b* that transitions to the short bottom wall 318. The extension 350 in this embodiment is also a part of the short bottom wall 318, but is shorter than the first embodiment (does not extend rearwardly as far as the first embodiment).

The engagement mechanism 360 is also different. In this case, there is a bridge portion 362 that extends upward from the extension 350 to engage a groove 266' on the fiber optic connector 200'. Preferably, the bridge portion 362 extends at least partially, and preferably fully across the short bottom wall 318 at the rear end 330. The bridge portion 362 may also be connected to the fiber optic connector guides 380*a*, 380*b*, 380*c*, and 380*d*, although this may not be a strict requirement. The fiber optic connector 200' also has a groove 266' that extends across the width of the fiber optic connector 200' rather than having it extend only a portion on each side of the housing of the fiber optic connector 200'. See FIG. 11.

In this embodiment, the short top wall 316 does not have a structure to engage the latch mechanism 212' of the fiber optic connector 200". See FIGS. 9 and 10.

Yet another embodiment of a dust cap 400 according to the present invention is illustrated in FIGS. 13-16. In this embodiment in the front portion 402 is different, as well as having different cutouts 434*a*, 434*b*, a different engagement mechanism 460, a different receptacle 470 for the latch mechanism 212" fiber optic connector 200", and the short top wall 416 being longer than the extension 450 (or short bottom wall 418).

Figure 15:
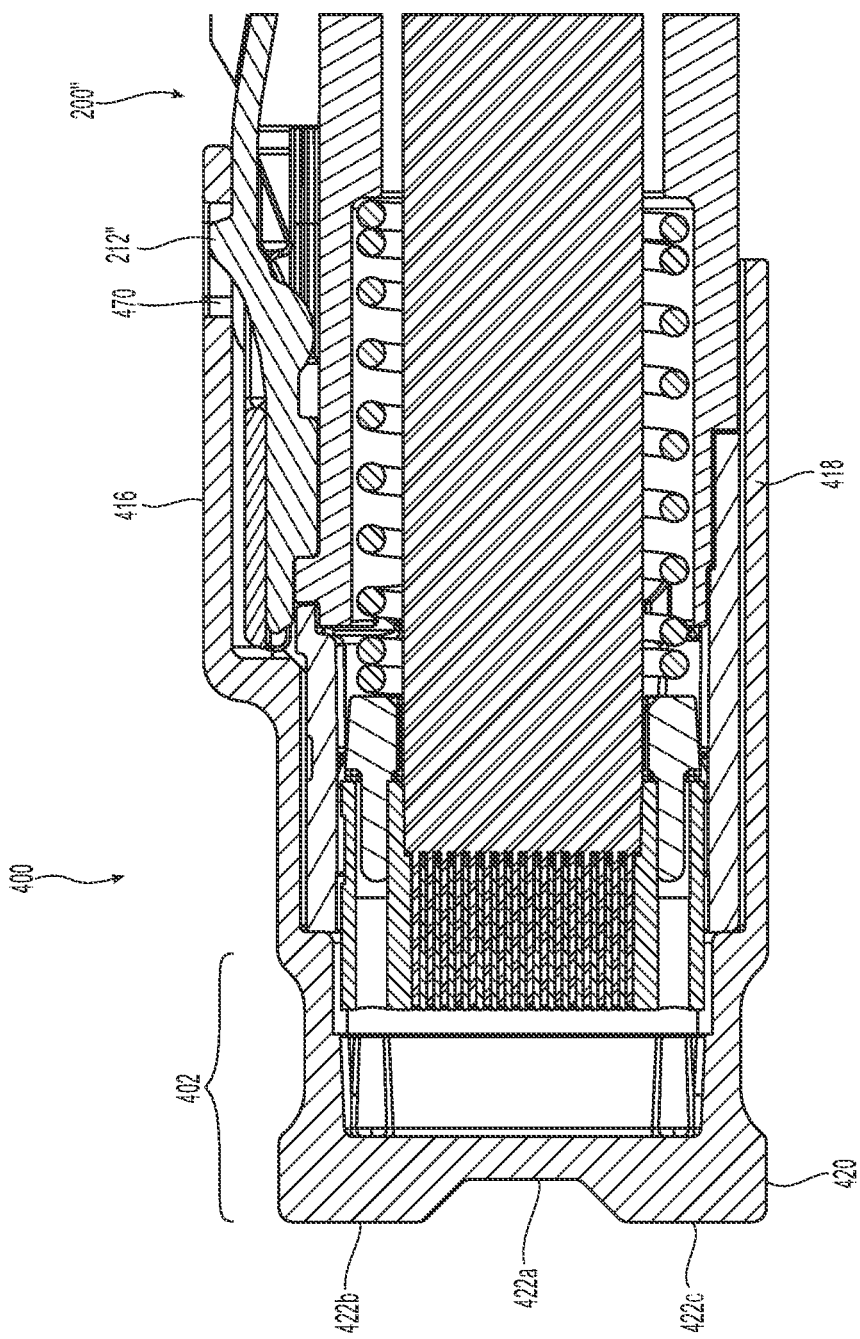
FIG. 15 is an elevational view of a cross section of the dust cap and the small form factor fiber-optic connector of FIG. 14.

The front portion 402 has a front end 420 that extends rearwardly from face 422 to a recessed portion 424. The front end 420 creates a place for the user to grab hold of the dust cap 400 for easy manipulation—removing or installing. In this case, the face 422 has three different flat portions, the middle portion 422*a* being recessed relative to the outer portions 422*b*, 422*c*. As illustrated in FIG. 15, the front end 420 is still sealed even with the recessed portion 422*a*. The front end 420 can also be used with the other embodiments.

The cutouts 434*a*, 434*b* extend closer to the short top wall 416 than in the previous embodiments, but still have a straight portion 440*a*, 440*b* and a curved portion 442*a*, 442*b* that then transitions to the short bottom wall 418. The short bottom wall 418 also functions as the extension 450. Rather than having the two projections and the two grooves or notches, the engagement mechanism 460 has two projections 466*a*, 466*b* on the extension 450 that engage two recesses on the housing 214" of the fiber optic connector 200".

The short top wall 416 has a receptacle 470 for the latch mechanism 212" that extends completely through the short top wall 416. The receptacle 470 is illustrated as being generally square, but could have other shapes. In this case, the short top and bottom walls 416, 418 are more flexible to allow for the insertion of the fiber optic connector 200" due to the cutouts 434a, 434b extending along a majority of the height of the dust cap 400 as with the other embodiment in FIGS. 1-7. In the internal opening 410 are the fiber optic connector guides 480a, 480b (and also the same with guides 480c and 480d which are not visible in the figures).

Figure 16:
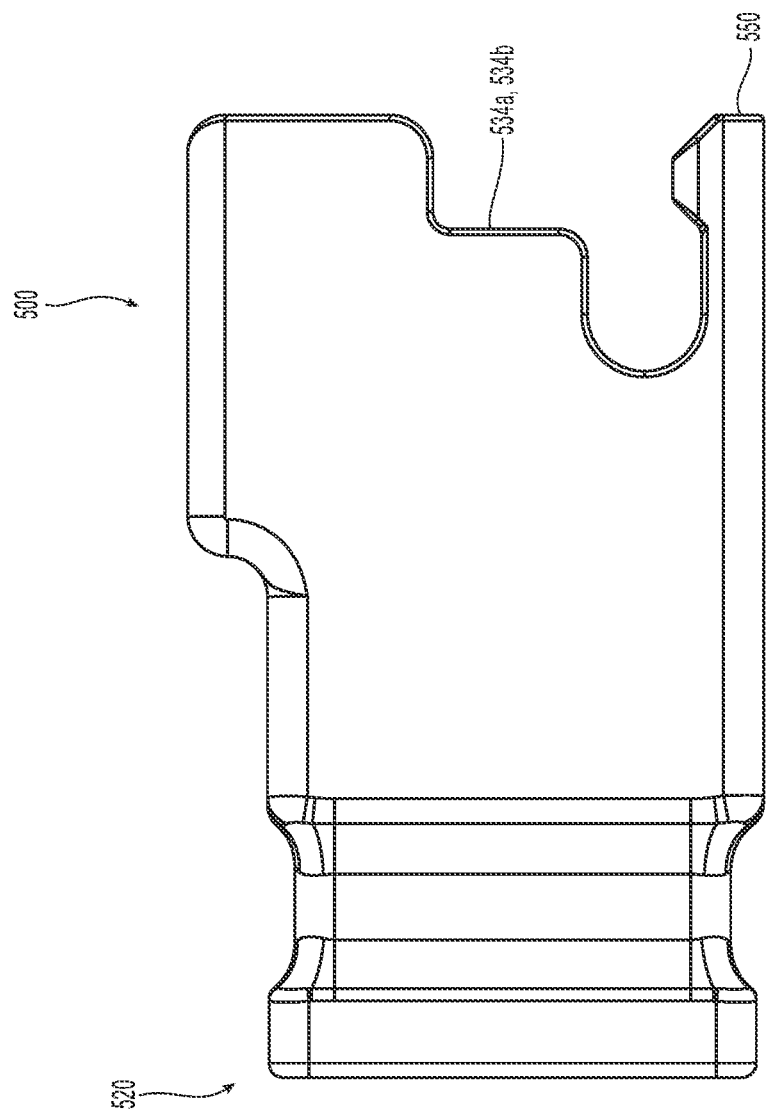
FIG. 16 is a side elevational view of a fourth embodiment of a dust cap for use with the fiber-optic connector according to the present invention.

FIG. 16 illustrates another embodiment of a dust cap 500 according to the present invention. The difference between this embodiment and that of dust cap 400 is the front end 520 and the cutouts 534a, 534b. The dust cap 500 has the same flat front face 522 of the first embodiment rather than having the recessed portions. The cutouts 534a, 534b are smaller and differently configured. While smaller, the cutouts 534a, 534b still allow enough flexibility of the extension 550 to receive the fiber optic connector 200".

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A small form factor dust cap for a fiber-optic connector comprising:
    a main body having a front portion, a middle portion, a rear portion, and an internal opening extending within the main body from the rear portion toward the front portion, the main body formed by two long side walls joined by a short top wall and an oppositely placed short bottom wall;
    a pair of cutouts in each of the respective two long side walls and located nearer to one of the short top wall and the short bottom wall, each of the pair of cutouts having a top edge and a bottom edge;
    an extension extending rearwardly from the middle portion and having a free end; and
    an engagement mechanism at the free end of the extension to engage a housing of the fiber optic connector.

2. The small form factor dust cap according to claim 1, wherein the cutouts in the two long side walls at least partially form the extension extending rearwardly from the middle portion.

3. The small form factor dust cap according to claim 1, wherein the extension is formed at least in part by the short bottom wall.

4. The small form factor dust cap according to claim 1, wherein the extension extends farther rearward than a rear end of the short top wall.

5. The small form factor dust cap according to claim 1, further comprising a receptacle in the short top wall to receive a portion of the fiber optic connector.

6. The small form factor dust cap according to claim 5, wherein the receptacle extends through an entirety of the short top wall.

7. The small form factor dust cap according to claim 1, wherein the engagement mechanism includes a projection from the extension and a groove disposed between the projection and the middle portion.

8. The small form factor dust cap according to claim 7, wherein the engagement mechanism also includes a portion a fiber-optic connector guide.

9. The small form factor dust cap according to claim 1, wherein the short top wall extends rearwardly beyond the extension.

10. The small form factor dust cap according to claim 1, wherein the engagement mechanism includes a bridge portion extending from one long side wall to the other long side wall.

11. A combination of a dust cap and a small form factor fiber-optic connector, the combination comprising:
    a dust cap having an internal opening to receive the small form factor fiber-optic connector, the dust cap further comprising:
        a main body having a front portion, a middle portion, a rear portion, and being formed by two long side walls joined by a short top wall and an oppositely placed short bottom wall;
        a guide mechanism extending from the rear portion toward the front portion of the main body to guide the small form factor fiber-optic connector within the internal opening;
        an engagement mechanism at the rear portion to engage with the fiber-optic connector; and
        a cutout in each of the long side walls of the dust cap, wherein the cutout is provided asymmetrically relative to the short top wall and the short bottom wall, each cutout having a top edge and a bottom edge; and
    the small form-factor fiber optic connector comprising:
        a push-pull boot having a latch mechanism extending forwardly and received at least partially within the internal opening of the dust cap, the push-pull boot supporting at least two optical fibers;
        a housing having a housing notch or a groove to receive the engagement mechanism of the dust cap;
        a ferrule cap engaged to the housing and located forward of the housing, the ferrule cap received at least partially within the internal opening of the dust cap; and
        a multi-fiber ferrule provided at least partially within the ferrule cap and having an end face fully enclosed by the dust cap when the dust cap is engaged with the small form factor fiber-optic connector.

12. The combination of a dust cap and a small form factor fiber-optic connector according to claim 11, wherein the cutouts in the two long side walls at least partially form an extension extending rearwardly from the middle portion and having the engagement mechanism.

13. The combination of a dust cap and a small form factor fiber-optic connector according to claim 12, wherein the extension is formed at least in part by the short bottom wall.

14. The combination of a dust cap and a small form factor fiber-optic connector according to claim 13, wherein the extension extends farther rearward than a rear end of the short top wall.

15. The combination of a dust cap and a small form factor fiber-optic connector according to claim 11, further comprising a receptacle in the short top wall to receive a portion of the fiber optic connector.

16. The combination of a dust cap and a small form factor fiber-optic connector according to claim 15, wherein the receptacle extends through an entirety of the short top wall.

17. The combination of a dust cap and a small form factor fiber-optic connector according to claim 11, wherein the engagement mechanism includes a projection and a groove, the groove disposed between the projection and the middle portion.

18. The combination of a dust cap and a small form factor fiber-optic connector according to claim 11, wherein the engagement mechanism also includes a portion of the guide mechanism.

19. The combination of a dust cap and a small form factor fiber-optic connector according to claim 11, wherein the short top wall extends rearwardly beyond the extension.

20. The combination of a dust cap and a small form factor fiber-optic connector according to claim 11, wherein the multi-fiber ferrule is a miniature multi-fiber ferrule of a first dimension of about 1.25 mm in a direction extending between the two long side walls and a second dimension of about 6.4 mm between the short top wall and the oppositely placed short bottom wall.

* * * * *